(12) United States Patent
Clowes

(10) Patent No.: X9865
(45) Date of Patent: Jul. 2, 1836

(54) FIRE, EXTINGUISHING

(76) Inventor: Isaac Clowes

Isaac Cloues of Norfolk. Virginia
Letters Patent

The schedule referred to in these Letters Patent and making part of the same, containing a description in the words of the said Isaac Cloues himself of his improvement in the art of extinguishing fires expeditiously in their first stage or early progress:–

---

To all to whom these presents shall come:– Be it known that I, Isaac Cloues of the Borough and County of Norfolk and State of Virginia have invented a new and useful improvement in the art of extinguishing of fires, and stopping the spread of the same nearly in all cases (especially in Towns and Cities) which has not been heretofore used or known, and that the following is a description of the construction and operation of said machine as invented and improved by me.

First – The common Pump standing in a well or cistern that receives the rain water from the roof of the house is changed to a force pump by having a double lever and two spouts or rather fossets which can be opened or shut at pleasure with a valve in the neck near the pump stock opening outwards; the lower valve standing as in all pumps now in use so that when the double pump handle is pulled down it forces down the plunger (having a valve to it) into the pump, and forces the water through the fosset No 2. when it is conducted through a pipe to a small reservoir on the top of the house which may contain ten gallons of water more or less as occasion may require. A fosset No 3. is fixed near the bottom of the reservoir to let the water out at pleasure to which a hose may be attached, and a person having one end of a rope fastened round his body, the other end being secured to a bolt on the centre of the roof can apply the water with the utmost facility and to great advantage through the windows into the interior or to any part of the exterior that may be on fire without peril or in fact the least chance of endangering his life as most firemen do under the present system of extinguishing of fires. When the surrounding houses are in danger of taking fire from the spark or falling cinders then the fosset No 3. is not opened and all the water that is forced into the reservoir runs out near the top and is conducted along the ridge of each house through a cylinder which has a number of small holes on either side through which the water issues out instantly, keeping the roof constantly wet during danger, nearly all the water being returned again to the cistern or well, rendering them almost inexhaustible.

The cistern are to have two covers of thick plank the first say twenty inches more or less
below the Top in which are a number of small holes to let the water pass freely into the
cistern and then filled up to the top with clean white sand first being laid over with
mats or straw of some kind to retain the sand from passing into the cistern.
The top cover is then placed on, full of small holes to let the rain water that falls on
the roofs of each house pass into the cisterns each house having one, thus the thick covers
and sand keep the water cool and sweet in the summer and from freezing in the winter
so than by this plan all the houses in every Town and City in any country may be more
abundantly supplied with better cool drinking water than Philadelphia is and better
adapted for extinguishing of fires with very small cost.
The copper pipe that conducts the water from the pump to the reservoir on the top of the
house is to be inclosed in a small wooden box and filled with pulverized charcoal
as a non-conductor to keep the water from freezing in extreme cold weather, and should
the tin cillender that conducts the water along the ridge of the roof freeze up the up
per part being a little concave with a flange on each side by pouring a bucket of
boiling water on to it, will free it constantly.
In addition to this a large cillender may be extended the whole length of a row of
buildings which may be constantly supplied from the reservoirs of each house, and
thus in a few minutes all the pumps may be Throwing water on to the house that
is on fire. If the house takes fire any where in the interior, the fosset No. 2. is shut
and a hose is placed to fosset No. 1. which is opened always for daily use and the
water is conducted through this hose into any part of the house as quick as a man
can apply it; and if this plan was adopted the fires might be put out nine times
out of ten before the large engines now in use reaches the spot --

Exd. Witnesses
W.E. William P. Elliot
Samuel Jarret

Isaac Glover

[illegible]